US012776303B2

(12) United States Patent
Weninger et al.

(10) Patent No.: US 12,776,303 B2
(45) Date of Patent: Oct. 27, 2026

(54) MULTI-ENCODER END-TO-END AUTOMATIC SPEECH RECOGNITION (ASR) FOR JOINT MODELING OF MULTIPLE INPUT DEVICES

(71) Applicant: Microsoft Technology Licensing, LLC, Redmond, WA (US)

(72) Inventors: Felix Weninger, Cambridge, MA (US); Marco Gaudesi, Turin (IT); Ralf Leibold, Julich (DE); Puming Zhan, Acton, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 215 days.

(21) Appl. No.: 18/627,433

(22) Filed: Apr. 4, 2024

(65) Prior Publication Data

US 2024/0249714 A1 Jul. 25, 2024

Related U.S. Application Data

(63) Continuation of application No. 17/354,480, filed on Jun. 22, 2021, now Pat. No. 11,978,433.

(51) Int. Cl.
*G10L 19/02* (2013.01)
*G10L 15/04* (2013.01)
(Continued)

(52) U.S. Cl.
CPC .............. *G10L 15/04* (2013.01); *G10L 19/02* (2013.01); *G10L 21/0208* (2013.01); *G10L 25/24* (2013.01)

(58) Field of Classification Search
CPC ..... G10L 15/04; G10L 19/02; G10L 21/0208; G10L 25/24
See application file for complete search history.

(56) References Cited

U.S. PATENT DOCUMENTS 5,737,485 A * 4/1998 Flanagan ................ G10L 15/16
704/E15.017
9,633,671 B2 * 4/2017 Giacobello ......... G10L 21/0208
(Continued)

OTHER PUBLICATIONS

X Wang, et.al., "Exploring end-to-end multi-channel ASR with bias information for meeting transcription," in Proc. of IEEE Spoken Language Technology Workshop (SLT), Shenzhen, China, 2021, pp. 833-840, IEEE (Year: 2021).*
(Continued)

*Primary Examiner* — Bhavesh M Mehta
*Assistant Examiner* — Nandini Subramani

(57) ABSTRACT

An end-to-end automatic speech recognition (ASR) system includes: a first encoder configured for close-talk input captured by a close-talk input mechanism; a second encoder configured for far-talk input captured by a far-talk input mechanism; and an encoder selection layer configured to select at least one of the first and second encoders for use in producing ASR output. The selection is made based on at least one of short-time Fourier transform (STFT), Mel-frequency Cepstral Coefficient (MFCC) and filter bank derived from at least one of the close-talk input and the far-talk input. If signals from both the close-talk input mechanism and the far-talk input mechanism are present for a speech segment, the encoder selection layer dynamically selects between the close-talk encoder and the far-talk encoder to select the encoder that better recognizes the speech segment. An encoder-decoder model is used to produce the ASR output.

20 Claims, 4 Drawing Sheets

(51) Int. Cl.
*G10L 21/0208* (2013.01)
*G10L 25/24* (2013.01)

(56) References Cited

U.S. PATENT DOCUMENTS

| | | | | |
|---|---|---|---|---|
| 9,886,963 | B2 * | 2/2018 | Atti | G10L 19/12 |
| 10,811,000 | B2 * | 10/2020 | Le Roux | G10L 17/00 |
| 10,937,441 | B1 * | 3/2021 | Kristjansson | G10L 21/0264 |
| 12,175,202 | B2 * | 12/2024 | Chiu | G06F 16/345 |
| 2018/0075860 | A1 * | 3/2018 | Parada | G10L 25/03 |
| 2019/0287012 | A1 * | 9/2019 | Celikyilmaz | G06F 16/345 |

OTHER PUBLICATIONS

Z. Zhang and H. Cao, "Joint Encoding/Decoding Algorithm Design Based on Hidden Information for Short-Length LT Codes," 2018 IEEE 4th International Conference on Computer and Communications (ICCC), Chengdu, China, 2018, pp. 2495-2499 (Year: 2018).*

Communication pursuant to Article 94(3) EPC Received for European Application No. 22744028.6, mailed on May 22, 2025, 03 pages.

* cited by examiner

MULTI-ENCODER END-TO-END AUTOMATIC SPEECH RECOGNITION (ASR) FOR JOINT MODELING OF MULTIPLE INPUT DEVICES

CROSS-REFERENCE TO RELATED APPLICATION

This application is a continuation application of and claims priority to U.S. patent application Ser. No. 17/354,480, entitled "MULTI-ENCODER END-TO-END AUTOMATIC SPEECH RECOGNITION (ASR) FOR JOINT MODELING OF MULTIPLE INPUT DEVICES," filed on Jun. 22, 2021, the disclosure of which is incorporated herein by reference in its entirety.

BACKGROUND OF THE DISCLOSURE

1. Field of the Disclosure

The present disclosure relates to systems and methods for automatic speech recognition (ASR) and relates more particularly to end-to-end ASR for joint modeling of multiple input devices.

2. Description of the Related Art

Conventional ASR systems achieve their best speech recognition accuracy under the condition in which the received data in real applications match the data used to train the models used by the ASR systems (referred to as matched condition training). For example, an ASR system trained with close-talk data (e.g., talk into a headphone worn by a speaker) performs much better on close-talk test data and significantly worse on far-talk test data (e.g., talk captured by microphone array mounted on the walls or ceiling of a room in which the speaker is present), or vice versa. An ASR system trained with mixed close-talk data and far-talk data achieves a similar level of accuracy for both close-talk test data and far-talk test data, which level of accuracy is lower than the case of matched condition training.

In an end-to-end ASR system, the acoustic, pronunciation and language models are all contained in a single neural network model. Moreover, in a multi-channel, end-to-end ASR system, the neural network also contains a neural beamforming front-end, which replaces the traditional signal-processing-based beamforming component. While the end-to-end modeling (i.e., single neural network model) is advantageous for achieving ASR accuracy, it has the drawback of not being able to easily switch components at runtime. Therefore, in the case the input of an ASR system could be close-talk data, far-talk data, or both, the best case scenario achievable with the current end-to-end ASR system is to train the neural network model with mixed close-talk data and far-talk data, which results in a lower level of ASR accuracy than the case of matched condition training. Therefore, there is need for a system and a method to achieve increased ASR accuracy in the case the input of an ASR system could be close-talk data, far-talk data, or both.

SUMMARY OF THE DISCLOSURE

According to an example embodiment of the present disclosure, an end-to-end ASR system encompassing multiple encoders is provided, e.g., one encoder configured for close-talk data input and a second encoder configured for multi-channel far-talk input. The example embodiment of the system can be used with different types of input devices in real applications, e.g., a headphone or an MP3 recorder for close-talk input and a microphone array for far-talk input, and the system achieves substantially the same ASR accuracy on both close-talk input devices and far-talk input devices as the level of accuracy achieved using an ASR system trained and tested in matched conditions.

An example embodiment of the end-to-end ASR system encompassing multiple encoders configured for different types of input devices enables switch between encoders according to the type of input device (e.g., a headphone or a microphone array in the doctor-patient conversation scenario) at runtime.

In another example embodiment of the end-to-end ASR system encompassing multiple encoders for different types of input devices, an encoder selection neural network is incorporated and trained to dynamically switch between the encoders to select the encoder that better captures the wanted speech signal.

According to another example embodiment of the end-to-end ASR system encompassing multiple encoders for different types of input devices, the probabilities of the encoder selection are used to calculate a weighted average of the different types of encoders, resulting in a system combination effect. In this example embodiment, the input signal is processed by both the close-talk encoder and the far-talk encoder, and the respective encoder output results are weighted according to the encoder-selection probability and then averaged to produce a final encoder output.

According to an example embodiment of the present disclosure, the multi-channel far-talk input is processed by a neural beamforming block, i.e., a neural network of the neural beamforming block learns how to map the noisy multi-channel signal to an enhanced single-channel signal.

In yet another example embodiment of the present disclosure, the neural beamforming block can be replaced by, or supplemented by, a traditional beamformer (e.g., minimum variance distortionless response (MVDR) beamformer, or delay-and-sum beamformer) that turns a multi-channel signal into a single-channel signal using a data-adaptive beamforming solution, i.e., an optimal beamforming solution is found analytically based on signal processing knowledge. In the present disclosure, "traditional beamformer" shall mean all beamformers other than a neural beamforming block.

DETAILED DESCRIPTION

Figure 1:
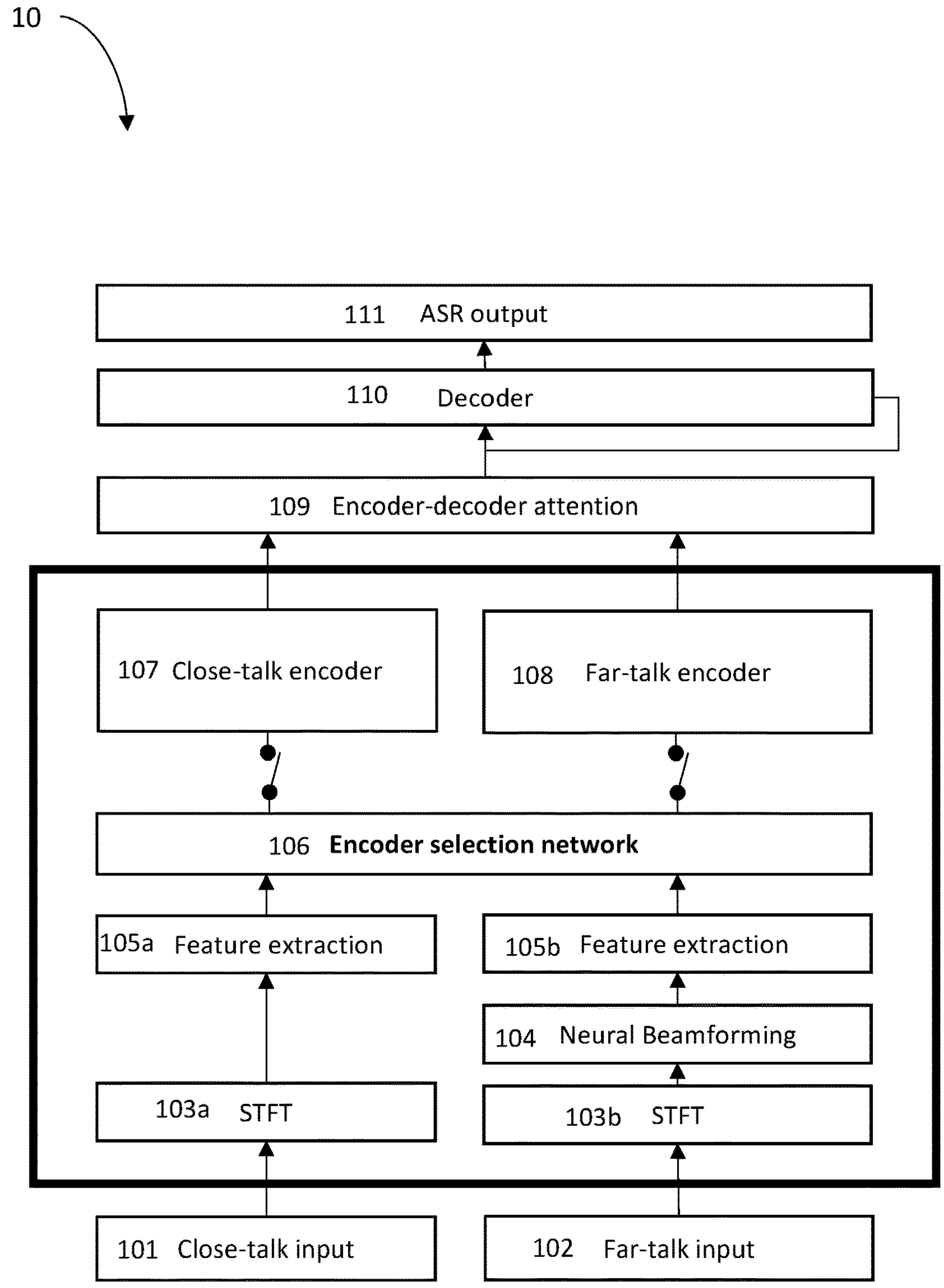
FIG. 1 illustrates the architecture of an example embodiment of an end-to-end ASR system.

FIG. 1 illustrates the architecture of an example embodiment of an end-to-end ASR system 10 encompassing multiple encoders for joint modeling of close-talk input and far-talk input. As shown in FIG. 1, the ASR system 10 is configured to handle one or both of close-talk input 101

(e.g., headphone input or MP3 recorder input) and far-talk input 102 (e.g., one or more microphones). Although i) a headphone input or an MP3 recorder input are presented here as examples of close-talk input, and ii) input from one or more microphones is presented here as an example of far-talk input, the ASR system according to the present disclosure is not limited to such specific input sources. In accordance with the present disclosure, speech features (e.g., filter bank, Mel-frequency Cepstral Coefficients (MFCCs), etc.) are extracted from the close-talk input and/or the far-talk input, and the extracted speech features are used to make the decision regarding which type of encoder (i.e., short-talk encoder or far-talk encoder) to use in generating the ASR output, as explained in further detail below.

As shown in FIG. 1, the close-talk input 101 and far-talk input 102 are fed into respective short-time Fourier transform (STFT) blocks 103*a* and 103*b* to generate respective STFT outputs. In ASR, the speech is processed frame-wise using a temporal window duration of 20-40 ms, and the STFT is used for the signal analysis of each frame. In the case of the STFT output generated by the STFT block 103*a* (for the short-talk input), the STFT output is fed to the feature extraction block 105*a*. The processing at the feature extraction block 105*a* can include: 1) conversion of STFT into power spectrum; and 2) computing filter bank features (collectively referred to as "filter bank") by applying triangular filters on a Mel-spectrum to the power spectrum to extract frequency bands (the Mel-spectrum is useful for mimicking the non-linear human ear perception of sound by being more discriminative at lower frequencies and less discriminative at higher frequencies). Optionally, Discrete Cosine Transform (DCT) can be applied to the filter bank features to generate a compressed representation of the filter bank features, which output is referred to as Mel-frequency Cepstral Coefficients (MFCC). In an example ASR system according to the present disclosure, any one of the following can be used as speech features for determining which type of encoder (e.g., close-talk or far-talk) should be used for generating the ASR output: i) the raw STFT output fed to the feature extraction block 105*a*; ii) the filter bank; iii) the MFCC; or iv) any other speech feature representation (e.g., Relative Spectral Transform-Perceptual Linear Prediction (RASTA-PLP)).

As shown in FIG. 1, in the case of the STFT output generated by the STFT block 103*b* (for the far-talk input), the STFT output is fed to the neural beamforming block 104. In the example embodiment shown in FIG. 1, the far-talk input can be multi-channel input (e.g., from a microphone array), in which case the neural network of the neural beamforming block 104 learns how to map the noisy multi-channel input to an enhanced single-channel signal. In the case the far-talk input is a single-channel input (e.g., a single microphone), the neural beamforming block 104 can be skipped (or the STFT fed into the beamforming block will simply pass the STFT to the next stage, the feature extraction block 105*b*). The processing at the feature extraction block 105*b* can include the same steps as described above for the feature extraction block 105*a*.

Figure 2:
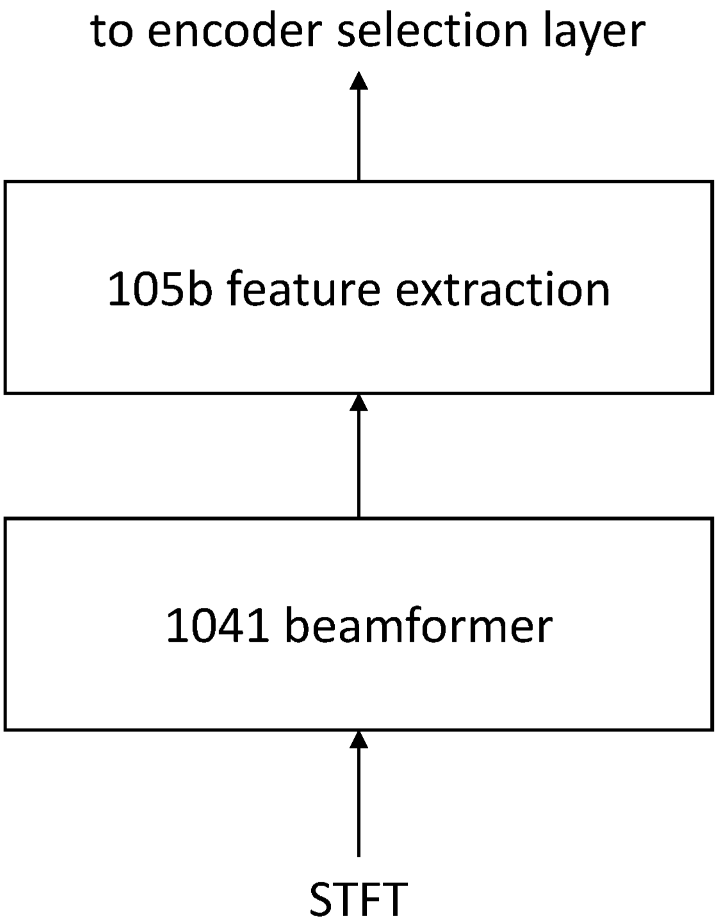
FIG. 2 illustrates an example embodiment of an end-to-end ASR system incorporating a beamformer instead of a neural beamforming block.

In another example embodiment of the ASR system according to the present disclosure, the neural beamforming block 104 shown in FIG. 1 can be replaced by a conventional beamformer (e.g., minimum variance distortionless response (MVDR) beamformer) that transforms a multi-channel signal into a single-channel signal using a data-adaptive beamforming solution, i.e., an optimal beamforming solution is found analytically based on signal processing knowledge. FIG. 2 shows such an example embodiment incorporating the beamformer 1041, with the remaining portions of the ASR system being substantially identical to the embodiment shown in FIG. 1.

Figure 3:
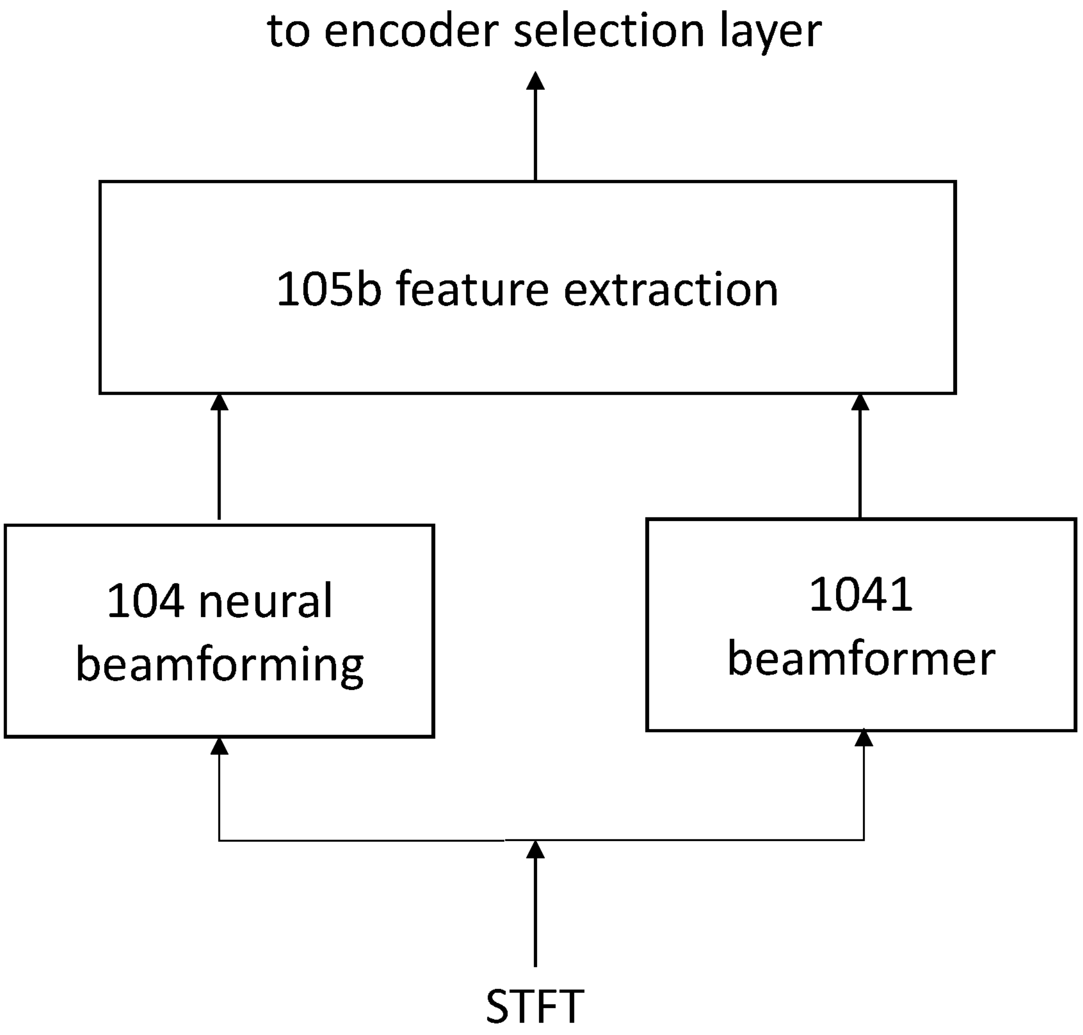
FIG. 3 illustrates an example embodiment incorporating both a beamformer and a neural beamforming block.

In yet another example embodiment of the ASR system according to the present disclosure, the neural beamforming block 104 shown in FIG. 1 can be supplemented by a conventional beamformer (e.g., minimum variance distortionless response (MVDR) beamformer). FIG. 3 shows such an example embodiment incorporating the beamformer 1041 and the neural beamforming block 104, with the remaining portions of the ASR system being substantially identical to the embodiment shown in FIG. 1.

The outputs from the feature extraction blocks 105*a* and 105*b* are fed to the encoder selection layer 106 to determine which encoder(s) should be used (i.e., short-talk encoder, far-talk encoder, or both) in generating the ASR output. In one example embodiment, the outputs (e.g., STFT, filter bank, or MFCC) from the feature extraction blocks 105*a* and 105*b* are both assessed to determine which encoder(s) should be used (i.e., selecting the close talk encoder 107 for close-talk input data, and selecting the far-talk encoder 108 for far-talk input data). If signals from only the close-talk input 101 is present at runtime, the close-talk encoder 107 is selected. Alternatively, if signals from only the far-talk input 102 is present at runtime, the far-talk encoder 108 is selected. If signals from the close-talk input 101 is followed by signals from the far-talk input 102 at runtime, the encoder selection layer 106 first selects the close-talk encoder 107 and then switches to the far-talk encoder 108.

In another example embodiment of the ASR system, the encoder selection layer 106 is configured and trained so that, if signals from both the close-talk input 101 and the far-talk input 102 are present at the same time (i.e., same speech captured by the close-talk input 101 and the far-talk input 102), the encoder selection layer 106 dynamically switches between the close-talk encoder 107 and the far-talk encoder 108 to select the encoder that better captures (recognizes) the particular speech. For example, in an example doctor-patient conversation scenario, it has been shown that the far-talk input (e.g., microphone array input) typically yields better recognition quality of the patient's speech, while the close-talk input (e.g., MP3 input) typically yields better recognition quality of the doctor's speech.

In another example embodiment of the ASR system, only one of the inputs (e.g., either close-talk input or far-talk input) is used to make the decision regarding which one of the encoders should be used to generate the ASR output. This implementation is possible because if a selected input (e.g., close-talk) signal quality is shown to be very low, this leads to the conclusion that using the encoder for the other input (e.g., far-talk) signal is likely to result in a better ASR output.

Figure 4:
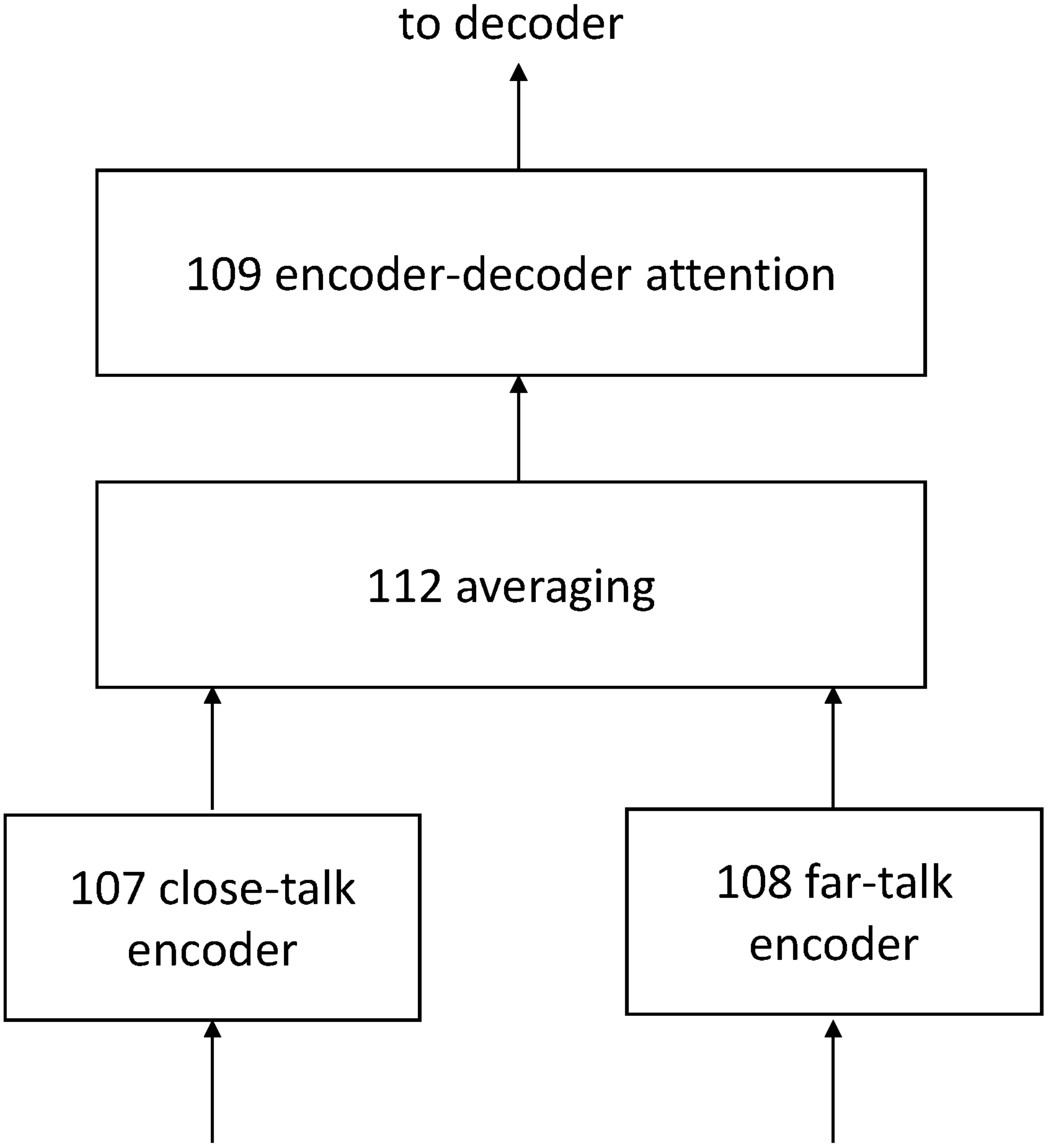
FIG. 4 illustrates an example embodiment of an end-to-end ASR system utilizing a weighted average of outputs of the close-talk and far-talk encoders for generating the ASR output.

In another example embodiment of the ASR system shown in FIG. 4, the known probabilities of the respective encoder selection (e.g., based on empirical data) are used to generate a weighted average of the close-talk and far-talk encoders, resulting in a system combination effect. In this example embodiment, the input signals from both the close-talk input 101 and the far-talk input 102 (i.e., the same speech captured by the two input devices) are put through both the close-talk encoder 107 and the far-talk encoder 108, and the respective encoder output results are weighted according to the known encoder-selection probabilities and then averaged to produce a final encoder output. As shown in FIG. 4, the outputs of the close-talk encoder 107 and the far-talk encoder 108 are fed to an averaging module 112, which in turn produces a weighted average of the outputs of the close-talk encoder 107 and the far-talk encoder 108. The remaining portions of the ASR system are substantially identical to the embodiment shown in FIG. 1

Continuing with the example embodiments of the ASR system according to the present disclosure, the output of the close-talk encoder 107 (FIG. 1), the output of the far-talk encoder 108 (FIG. 1), and/or the output of the averaging module 112 (FIG. 4) are fed to the encoder-decoder attention module 109 shown in FIGS. 1 and 4. The example end-to-end ASR model used in the ASR system according to the present disclosure and shown in FIG. 1 is the attention-based encoder-decoder model (in which the attention mechanism is referenced herein as "the encoder-decoder attention"), but the present disclosure is intended to encompass any suitable encoder-decoder system (e.g., attention-based encoder-decoder system or recurrent neural network transducer (RNN-T). The attention-based encoder-decoder model learns a direct mapping of input features to outputs based on joint learning of the language model, the acoustic model, and the pronunciation model. The encoder (e.g., 107 or 108) maps the input features (e.g., filter bank or MFCC) into high-level representations. The attention mechanism (i.e., the encoder-decoder attention module 109) goes through the whole input sentence (or segment) to calculate the weights which reflect the frames that should be focused for the current output unit (e.g., phoneme, word-piece, or word), then feeds the weighted features into the decoder. The decoder 110 serves as a language model which utilizes attention to summarize the encoder's representations to produce the ASR output 111. As shown in FIG. 1, the decoder 110 is a recurrent neural net which takes the encoder output and the last output of the decoder at t−1 as inputs to produce the output at time t.

The end-to-end ASR system according to the present disclosure consists of a single neural network. The multiple encoders and the encoder selection incorporated in the example embodiment of the ASR system can be trained jointly with the rest of the network, and thus the example embodiment of the ASR system according to the present disclosure is as easy to train as the conventional end-to-end ASR system.

Experimental results obtained using the example embodiments of the ASR system incorporating dual encoders for close-talk and far-talk speech in the doctor-patient conversation scenario show several advantages. First, the example embodiments of the ASR system according to the present disclosure incorporating the dual encoders yield substantially the same accuracy on the close-talk speech as a conventional end-to-end ASR system dedicated to close-talk speech (whose accuracy is degraded when used on the microphone array signal). Second, the example embodiments of the ASR system according to the present disclosure yield substantially the same accuracy on the far-talk speech as a conventional end-to-end ASR system containing a neural beamforming frontend (which conventional system cannot be directly used on the single-channel close-talk speech). Third, by using i) the encoder selection layer to switch between the close-talk encoder and the far-talk encoder, or ii) the weighted averaging of the close-talk and far-talk encoders, significant accuracy improvement (i.e., up to 9% relative word error rate (WER) reduction) is achieved compared to using either the conventional close-talk or far-talk end-to-end ASR system, and the resulting accuracy is substantially similar to the level of accuracy achieved by the oracle system combination of the conventional close-talk and far-talk end-to-end ASR systems (i.e., assuming to know which one of the conventional close-talk and far-talk ASR system would perform better on each utterance). Fourth, because the encoder selection by the encoder selection layer is based on the input features (which are readily computed), it is not necessary to evaluate the encoders (which would be much more intensive) before making the encoder selection, and therefore the example embodiments of the ASR system achieve real-time ASR results in similar time scale as the conventional single-encoder ASR systems.

The present disclosure provides a first example of an end-to-end automatic speech recognition (ASR) system which includes: a first encoder configured for close-talk input captured by a close-talk input mechanism; a second encoder configured for far-talk input captured by a far-talk input mechanism; and an encoder selection layer configured to select at least one of the first and second encoders for use in producing ASR output, wherein the selection is made using at least one of the close-talk input and the far-talk input. which method includes:

The present disclosure provides a second example system based on the above-discussed first example system, in which second example system the encoder selection layer is configured to select the at least one of the first and second encoders based on a speech feature derived from at least one of the close-talk input and the far-talk input.

The present disclosure provides a third example system based on the above-discussed second example system, in which third example system at least one of: a) the far-talk input mechanism is a multi-channel input mechanism for capturing multi-channel far-talk input; and b) the speech feature is at least one of short-time Fourier transform (STFT), Mel-frequency Cepstral Coefficient (MFCC) and filter bank derived from at least one of the close-talk input and the far-talk input.

The present disclosure provides a fourth example system based on the above-discussed second example system, in which fourth example system if signals from both the close-talk input mechanism and the far-talk input mechanism are present for a speech segment, the encoder selection layer dynamically selects between the close-talk encoder and the far-talk encoder to select the encoder that better recognizes the speech segment.

The present disclosure provides a fifth example system based on the above-discussed first example system, in which fifth example system only one of the close-talk input or the far-talk input is used to select the at least one of the first and second encoders for producing ASR output.

The present disclosure provides a sixth example system based on the above-discussed second example system, in which sixth example system if signals from both the close-talk input mechanism and the far-talk input mechanism are present for a speech segment: i) the at least one of the STFT, the MFCC and the filter bank derived from the close-talk input is processed by the close-talk encoder to produce an output, and the at least one of the STFT, the MFCC and the filter bank derived from the far-talk input is processed by the far-talk encoder to produce an output; and ii) the outputs of the close-talk encoder and the far-talk encoder are weighted according to known encoder-selection probabilities and averaged to produce a final encoder output.

The present disclosure provides a seventh example system based on the above-discussed third example system, which seventh example system further includes: at least one of a neural beamforming element and a traditional beamformer configured to transform the multi-channel far-talk input signal into a single-channel far-talk signal.

The present disclosure provides an eighth example system based on the above-discussed second example system, which eight example system further includes: a feature extraction module configured to generate at least one of the filter bank and the MFCC from at least one of the close-talk input and the far-talk input.

The present disclosure provides a ninth example system based on the above-discussed second example system, which ninth example system further includes: a decoder configured to produce the ASR output using an output from at least one of the close-talk encoder and the far-talk encoder.

The present disclosure provides a tenth example system based on the above-discussed ninth example system, in which tenth example system an encoder-decoder model is used in conjunction with the encoder and the decoder to produce the ASR output.

The present disclosure provides a first example method of operating an automatic speech recognition (ASR) system, which first example method includes: providing a first encoder configured for close-talk input captured by a close-talk input mechanism; providing a second encoder configured for far-talk input captured by a far-talk input mechanism; and providing an encoder selection layer configured to select at least one of the first and second encoders for use in producing ASR output, wherein the selection is made using at least one of the close-talk input and the far-talk input.

The present disclosure provides a second example method based on the above-discussed first example method, in which second example method the encoder selection layer is configured to select the at least one of the first and second encoders based on a speech feature derived from at least one of the close-talk input and the far-talk input.

The present disclosure provides a third example method based on the above-discussed second example method, in which third example method at least one of: a) the far-talk input mechanism is a multi-channel input mechanism for capturing multi-channel far-talk input; and b) the speech feature is at least one of short-time Fourier transform (STFT), Mel-frequency Cepstral Coefficient (MFCC) and filter bank derived from at least one of the close-talk input and the far-talk input.

The present disclosure provides a fourth example method based on the above-discussed second example method, in which fourth example method if signals from both the close-talk input mechanism and the far-talk input mechanism are present for a speech segment, the encoder selection layer dynamically selects between the close-talk encoder and the far-talk encoder to select the encoder that better recognizes the speech segment.

The present disclosure provides a fifth example method based on the above-discussed first example method, in which first example method only one of the close-talk input or the far-talk input is used to select the at least one of the first and second encoders for producing ASR output.

The present disclosure provides a sixth example method based on the above-discussed second example method, in which sixth example method if signals from both the close-talk input mechanism and the far-talk input mechanism are present for a speech segment: i) the at least one of the STFT, the MFCC and the filter bank derived from the close-talk input is processed by the close-talk encoder to produce an output, and the at least one of the STFT, the MFCC and the filter bank derived from the far-talk input is processed by the far-talk encoder to produce an output; and ii) the outputs of the close-talk encoder and the far-talk encoder are weighted according to known encoder-selection probabilities and averaged to produce a final encoder output.

The present disclosure provides a seventh example method based on the above-discussed third example method, which seventh example method further includes: providing at least one of a neural beamforming element and a traditional beamformer configured to transform the multi-channel far-talk input signal into a single-channel far-talk signal.

The present disclosure provides an eight example method based on the above-discussed second example method, which eight example method further includes: providing a feature extraction module configured to generate at least one of the filter bank and the MFCC from at least one of the close-talk input and the far-talk input.

The present disclosure provides a ninth example method based on the above-discussed second example method, which ninth example method further includes: providing a decoder configured to produce the ASR output using an output from at least one of the close-talk encoder and the far-talk encoder The present disclosure provides a tenth example method based on the above-discussed ninth example method, in which tenth example method an encoder-decoder model is used in conjunction with the encoder and the decoder to produce the ASR output.

What is claimed is:

1. An automatic speech recognition (ASR) system, comprising:
- a first encoder configured for close-talk input captured by a close-talk input mechanism;
- a second encoder configured for far-talk input captured by a far-talk input mechanism; and
- an encoder selection layer configured to select the first encoder, the second encoder, or both, based on a first speech feature derived from the close-talk input, a second speech feature derived from the far-talk input, or both,
- wherein upon determining that signals from both the close-talk input mechanism and the far-talk input mechanism are present for a speech segment:
  - the first encoder processes the first speech feature derived from the close-talk input to produce a first output, and the second encoder processes the second speech feature derived from the far-talk input to produce a second output; and
  - the first output of the first encoder and the second output of the second encoder are weighted according to encoder-selection probabilities and averaged to produce a combined output.

2. The system of claim 1, wherein the combined output comprises a final encoder output.

3. The system of claim 1, wherein the far-talk input is a multi-channel far-talk input that is processed by a neural network, wherein the neural network learns mapping the multi-channel far-talk input to an enhanced single-channel input.

4. The system of claim 1, wherein the far-talk input is a multi-channel far-talk input that is processed by a beamformer, wherein the beamformer turns the multi-channel far-talk input to a single-channel input using a data-adaptive beamforming solution.

5. The system of claim 1, wherein the first speech feature is at least one of a short-time Fourier transform (STFT), a Mel-frequency Cepstral Coefficient (MFCC), or a filter bank derived from the close-talk input.

6. The system of claim 1, wherein the second speech feature is at least one of a short-time Fourier transform (STFT), a Mel-frequency Cepstral Coefficient (MFCC), or a filter bank derived from the far-talk input.

7. The system of claim 1, wherein the close-talk input mechanism comprises a first type of input device comprising a headphone or an MP3 recorder.

8. The system of claim 1, wherein the far-talk input mechanism comprises a second type of input device.

9. The system of claim 8, wherein the second type of input device comprises a microphone array.

10. The system of claim 1, wherein the combined output is fed to an attention-based encoder-decoder model that learns a mapping of input features to output features based on joint learning of a language model, an acoustic model, and a pronunciation model.

11. A computer-implemented method of operating an automatic speech recognition (ASR) system, comprising:

providing a first encoder configured for close-talk input captured by a close-talk input mechanism;

providing a second encoder configured for far-talk input captured by a far-talk input mechanism; and providing an encoder selection layer configured to select the first encoder, the second encoder, or both, based on a first speech feature derived from the close-talk input, a second speech feature derived from the far-talk input, or both, wherein upon determining that signals from both the close-talk input mechanism and the far-talk input mechanism are present for a speech segment:

the first encoder processes the first speech feature derived from the close-talk input to produce a first output, and the second encoder processes the second speech feature derived from the far-talk input to produce a second output; and the first output of the first encoder and the second output of the second encoder are weighted according to encoder-selection probabilities and averaged to produce a combined output.

12. The computer-implemented method of claim 11, wherein the combined output comprises a final encoder output.

13. The computer-implemented method of claim 11, wherein the far-talk input is a multi-channel far-talk input that is processed by a neural network, wherein the neural network learns mapping the multi-channel far-talk input to an enhanced single-channel input.

14. The computer-implemented method of claim 11, wherein the far-talk input is a multi-channel far-talk input that is processed by a beamformer, wherein the beamformer turns the multi-channel far-talk input to a single-channel input using a data-adaptive beamforming solution.

15. The computer-implemented method of claim 11, wherein the first speech feature is at least one of a short-time Fourier transform (STFT), a Mel-frequency Cepstral Coefficient (MFCC), or a filter bank derived from the close-talk input.

16. The computer-implemented method of claim 11, wherein the second speech feature is at least one of a short-time Fourier transform (STFT), a Mel-frequency Cepstral Coefficient (MFCC), or a filter bank derived from the far-talk input.

17. The computer-implemented method of claim 11, wherein the close-talk input mechanism comprises a first type of input device.

18. The computer-implemented method of claim 17, wherein the first type of input device comprises a headphone or an MP3 recorder.

19. The computer-implemented method of claim 11, wherein the far-talk input mechanism comprises a second type of input device comprising a microphone array.

20. The computer-implemented method of claim 11, wherein the combined output is fed to an attention-based encoder-decoder model that learns a mapping of input features to output features based on joint learning of a language model, an acoustic model, and a pronunciation model.

* * * * *